United States Patent Office 2,921,834

Patented Jan. 19, 1960

2,921,834

PROCESS FOR PREPARING METAL SELENIDES

Walter C. Benzing, Metuchen, N.J., assignor to Merck & Co., Inc., Rahway, N.J., a corporation of New Jersey No Drawing. Application January 31, 1957
Serial No. 637,357

4 Claims. (Cl. 23—50)

This invention relates generally to a method for preparing metallic selenides. More particularly, it is concerned with a process for making metallic selenides by hydrazine reduction of an ammine metal selenite. Still more particularly, it is concerned with the hydrazine reduction of the ammine selenites of copper, zinc and cadmium.

The selenides of copper, zinc and cadmium are semiconductors of importance in the electronics industry. For instance, the selenides of zinc and cadmium, when suitably activated, have photoluminescent and photoconducting properties. After activation with a small amount of copper, zinc selenide luminesces red under cathode-ray bombardment, and cadmium selenide becomes a broad spectrum photoconductor having particular sensitivity at the red end of the spectrum. Such compounds are useful in the so-called "magic eye" devices and in some color television systems. Selenides of copper are likewise semi-conductors of value in the electronic field.

As electronic chemicals, it is of utmost importance that these metal selenides be ultra-pure, that is substantially free of metals of groups in the periodic table of elements other than those used as activators. Freedom from group VIII metals, such as iron, cobalt and nickel, is particularly critical since even a few parts per million of such contaminants seriously interfere with the semi-conducting properties. In their ultra-pure state, the metal selenides are known as intrinsic selenides. The intrinsic selenides themselves should have little or no semi-conducting properties.

The electronic properties appear when the balance of electrical charges in the ultra-pure selenides is disturbed by the presence of imperfections. These may be vacancies caused by a slight compositional imbalance or by the incorporation of certain types of foreign atoms (activators) into the selenide. The activators are normally metals of the periodic table groups which bracket the groups of the main constituent elements. For instance, copper and silver, of group I–B, are common activators for zinc and cadmium selenides, zinc and cadmium falling in group II–B. The amount of activator must be rigorously controlled and is ordinarily accomplished today by first obtaining the selenide in the highly pure state (the intrinsic form) and then incorporating a measured amount of the desired activator. This step of introducing the desired "impurity" is referred to as "activating" or "doping." The amount of activator may vary from about 0.001 to about 0.1 mole percent of the final product, 0.01 mole percent being satisfactory in most cases.

It will be appreciated, therefore, that any feasible synthesis of copper, zinc and cadmium selenides must be capable of giving ultra-pure selenides for the electronic industry as well as meeting other requirements such as high yield and freedom from health and safety hazards. The selenides are highly toxic materials and care must be taken to avoid exposure to them.

One method for the manufacture of certain selenides suitable for use by the electronics industry comprises the reduction of a metal selenite with hydrazine, and decomposition, where necessary, of the intermediate selenide hydrazinate by means of heat or acid, or by a combination of heat and acid. This process, as well as the new products formed therein, is described more fully and claimed in the copending patent application of my associates Conn, Magee and Sheehan, Serial No. 614,083, filed October 5, 1956. While that process leads to the formation of metal selenides of any desired degree of purity in substantially quantitative yields, it suffers one disadvantage in that the hydrazine reduction is carried out by adding metal selenites in the solid state to an aqueous hydrazine solution. Since the reduction is a vigorous reaction, the necessity of charging one of the reactants as a solid presents difficulties which could be oviated to a great degree if the reactants, i.e. the metal selenite and the hydrazine, could be mixed as solutions.

It is an object of my invention to provide a process for the hydrazine reduction of selenites in which the selenite and the hydrazine are both in solution prior to reaction. It is a further object to provide a method of solubilizing a metal selenite. Another object of this invention is the provision of a method of making copper, zinc and cadmium selenides or their immediate precursors, the selenide hydrazinates from readily available starting materials by a process in which the use of solid reactants is eliminated. Still further objects of my invention are the solubilization of copper, zinc and cadmium selenites by formation of their water soluble ammine complexes, and the reduction of such complexes with hydrazine. Another object is a process by which copper, zinc and cadmium selenides may be readily and conveniently activated or "doped" during their synthesis. Still another object is a process for making the selenides or selenide hydrazinates of copper, zinc and cadmium which is particularly suited for continuous operation. Other objects appear hereinafter.

The basic overall process for making selenides of copper, zinc and cadmium by hydrazine reduction of the appropriate metal selenite may be illustrated by the Equation 1:

$$(1)\qquad 2MSeO_3+5N_2H_4 \rightarrow 2MSe+2N_2H_4(+6H_2O+3N_2)$$

The modified process of my invention is illustrated by Equation 2:

$$(2)\qquad 2M(NH_3)_xSeO_3 \rightleftarrows 2M(NH_3)_x^{++} + 2SeO_3^{=} \xrightarrow[5N_2H_4]{} 2MSe + 2N_2H_4\ (+\ 2xNH_3 + 6H_2O + 3N_2)$$

wherein M is the metal, copper, zinc or cadmium, and $x$ is a whole number which may have a value of 3–6 inclusive. In most cases, and especially with copper salts, $x=4$.

In my process, an aqueous solution of the ammine metal selenite is added to a preheated aqueous solution of hydrazine. Ordinarily a substantial excess of hydrazine over the stoichiometric amount is used, preferably at least four moles of hydrazine hydrate per mole of ammine metal selenite. Optimum results are realized using about seven moles of hydrazine hydrate per mole of ammine selenite, and even larger excesses may be employed if desired. The reducing agent is commonly charged to the reaction as 85% hydrazine hydrate, although it may be diluted with water, if desired, prior to addition of the ammine metal selenite.

The aqueous solution of ammine selenite preferably contains excess ammonia and, in some cases such as in the reduction of a cadmium salt, the presence of ammonium carbonate is desirable in order to increase the solubility of the tetrammine complex. The complex is added to the hydrazine at a rate sufficient to maintain a steady evolution of nitrogen from the reaction mixture but care should be taken to avoid too rapid mixing of the reactants since violent evolution of gas may occur under such conditions.

Although one is not necessary when the reduction is carried out at elevated temperature, I prefer to employ a reaction catalyst comprising a small amount of an anion of an organic carboxylic acid, such as formate, acetate, propionate, butyrate or benzoate ion. The catalyst is added to the hydrazine before the ammine selenite complex either as the free acid, e.g. acetic acid, propionic acid, formic acid, benzoic acid, or as an appropriate salt, e.g. zinc acetate, cadmium acetate, copper acetate, zinc formate, cadmium propionate and the like. The course of hydrazine reduction depends on the particular ammine metal selenite being reduced, although in every case the complete reduction to selenide follows Equation 2 above. When the zinc and cadmium ammine selenites are treated wih excess hydrazine, there is first obtained an intermediate metal selenide hydrazinate of the formula $$MSe.N_2H_4$$

wherein M is zinc or cadmium. These intermediates are subsequently converted by heat or acid to the corresponding selenides.

The conversion of the zinc or cadmium selenide hydrazinate to the corresponding selenide is carried out by digesting or warming the hydrazinate with excess acetic acid, preferably at a temperature of 70–85° C. The acid treatment is continued for about one to three hours for optimum results. At the end of this period, the solid selenides are isolated by filtration and dried in an inert atmosphere. They are amorphous solids varying in color from bright yellow zinc selenide to brownish-black cadmium selenide.

The conversion of the hydrazinate to the selenide is preferably carried out in the absence of oxygen and in dim light since in the wet state the selenides are readily oxidized. When isolated and dried, however, the zinc and cadmium selenides are amorphous solids reasonably stable in the presence of oxygen, although they are light sensitive. The stability of cadmium selenide hydrazinate at reaction temperature is such that it will decompose to the selenide directly in the hydrazine reaction mixture if the mixture is kept at an elevated temperature for sufficient time. The mixture becomes dark brown to black when the cadmium selenide hydrazinate converts to cadmium selenide.

When an ammine copper selenite is reduced with hydrazine, the reaction is more vigorous than with the zinc and cadmium ammine selenites, and the copper selenide is the first solid product formed in the reaction mixture.

The reaction conditions for the hydrazine reduction of the copper ammine selenite are generally the same as those discussed above for the first step of the zinc and cadmium ammine selenite reduction. A solution of ammine copper selenite is added gradually to the hydrazine solution at an elevated temperature and the reaction allowed to continue until nitrogen evolution is essentially complete. The solid metal selenide is filtered from the reaction mixture, washed free of mother liquor and dried. The copper selenides thus produced are crystalline or semi-crystalline solids in contrast to the amorphous zinc and cadmium selenides.

It will be realized by those skilled in the art that my process may be used for making metal selenides of any desired degree of purity from the corresponding ammine selenites. However, the method is particularly advantageous and useful for making ultra-pure selenides for use in the electronics industry. To do this, the ammine metal selenite and the hydrazine used as starting materials should be sufficiently pure to preclude any of the contaminants present therein from carrying through to the selenide, and care is taken to employ solvents, acids, and equipment which do not introduce undesired impurities. In this way, I have prepared zinc and cadmium selenides that are substantially spectro-photometrically pure. For instance, I have made zinc selenide having less than one part per million of group VIII metals and less than ten parts per million of the elements of groups I. III, V and VII of the periodic table.

Another aspect of my invention lies in the activation of the intrinsic metal selenides during their preparation. This is accomplished by adding a small amount of a salt of the activator metal to the copper, zinc or cadmium ammine selenite solution before it is reduced with hydrazine. Copper and silver are the usual activators for the selenides, and may be added in the form of a water soluble salt to the ammine selenite. During the reduction process the metallic activator becomes diffused through the selenide molecule. Only small quantities, of the order of 0.001 to 0.1 mole percent and preferably about 0.01 mole percent of activator are employed, the exact amount depending upon the intended use of the end product. It will be evident that in referring to the substantial spectrophotometric purity of activated selenides made by this process, I do not intend to include the activating metal as an undesirable contaminant.

As more completely set forth in the detailed experimental examples appearing below, the ammine selenites used as one of the starting materials are prepared by treating a metal salt, such as a sulfate, acetate or oxide, with selenious acid and ammonia. In some instances, particularly with cadmium salts, it is preferred to add ammonium carbonate as well as ammonia to the reaction mixture in order to increase the solubility of the ammine cadmium selenite. The ammonium carbonate also performs a useful function in the latter stages of the process inasmuch as it increases slightly the solubility of cadmium selenide, thereby permitting the growth of larger particles of the selenide.

The following examples are given for purposes of illustration and not by way of limitation:

EXAMPLE 1

*Zinc selenide; zinc selenide hydrazinate*

2160 grams of zinc acetate dihydrate was added to 2160 ml. of deionized water in a 12 liter flask equipped with a gas sparger. Ammonia gas was added until the solution became clear, the temperature during addition being held below 40° C. 7.5 liters of selenious acid (133.5 grams $SeO_2$ per liter) was charged over one hour, and the temperature maintained at 34–45° C. The pH of the final slurry was adjusted to 7.8 with redistilled glacial acetic acid. The solid zinc selenite was filtered, and washed with 1.5 liters of deionized water.

The wet selenite was added to 1150 ml. of deionized water and dissolved by the addition of ammonia gas at a temperature below 35° C. to form a solution of ammine zinc selenite.

Four liters of redistilled 85% hydrazine hydrate and 50 grams zinc acetate were mixed and heated to 80° C. The ammine zinc selenite solution prepared above was added, over a period of one and one-half hours, at 85–95° C., to the hydrazine solution. The charging funnel was then flushed with 200 ml. of saturated aqueous ammonia and the reaction mixture agitated at 90° C. for an additional one-half hour. The resulting slurry of zinc selenide hydrazinate was cooled and filtered, and the solid washed with four liters of deionized water.

The wet zinc selenide hydrazinate cake was added to two liters of redistilled glacial acetic acid and two liters of deionized water. The mixture was digested for two hours. The resulting zinc selenide slurry was cooled, filtered and washed with three liters of deionized water and one liter of methanol and dried at 100° C. in a carbon dioxide atmosphere. Dry weight—1500 grams.

When the above experiment is repeated and 0.01 mole percent of silver acetate added to the aqueous ammoniacal solution of ammine zinc selenite, the zinc selenide obtained after acetic acid digestion of the hydrazine reduction product contains about 0.01 mole percent of silver, i.e. it is silver-activated zinc selenide.

EXAMPLE 2

*Zinc selenide; zinc selenide hydrazinate*

95 grams of pure zinc oxide (1.17 moles) was added to a solution of 200 ml. of pure selenious acid containing 127 grams of selenium dioxide (1.17 moles). The temperature of the mixture was maintained below 60° C. by external cooling. Ammonia gas was then charged into the resulting white slurry until a clear solution of ammine zinc selenite was obtained.

This solution was then added dropwise to 700 ml. of 85% hydrazine hydrate containing five grams of zinc acetate and five grams of acetic acid. The hydrazine solution had been preheated to 80–85° C. During addition of the ammine zinc selenite the reaction temperature was maintained at 85–95° C. After nitrogen evolution had stopped, the resulting slurry of zinc selenide hydrazinate was filtered and the solid product washed with water.

The solid material was added to 300 ml. of deionized water and 300 ml. of glacial acetic acid, and the mixture heated at 60° C. for two hours. At the end of this time, the resulting solid zinc selenide was filtered, washed with two liters of deionized water and dried overnight in an inert atmosphere. 180 grams of zinc selenide was obtained.

When 0.01 mole percent of copper acetate is added to the ammine zinc selenite solution of paragraph 1 above, and the remaining steps of the process carried out as set forth above, activated zinc selenide containing about 0.01 mole percent of copper is obtained.

EXAMPLE 3

*Cadmium selenide; cadmium selenide hydrazinate*

480 grams of cadmium selenite (1.95 moles) was added to 800 ml. of deionized water containing dissolved ammonia and 210 grams of ammonium carbonate. An additional 200 ml. of water was added to the mixture and the solid dissolved by addition of ammonia gas.

The resulting solution of ammine cadmium selenite was slowly added to a mixture of 1060 ml. of 85% hydrazine hydrate and 20 ml. of glacial acetic acid which had been preheated to 80–90° C. The addition of the cadmium salt required about 90 minutes.

At the end of this time, and after nitrogen evolution was complete, there was obtained a dark brown mixture containing solid cadmium selenide hydrazinate and cadmium selenide. The solid material was isolated by filtration and washed with 800 ml. of water. The wet solid was then slurried with two 400 ml. portions of 50% acetic acid and finally washed with water and methanol. The solid cadmium selenide thus obtained, upon drying in vacuo at 100° C., weighed 361 grams.

EXAMPLE 4

*Cadmium selenide; cadmium selenide hydrazinate*

Ammonia gas was added with external cooling to a solution of 655 grams of selenious acid containing 112 grams of selenium dioxide (1.01 moles) until the pH of the solution was 8. 105 grams of ammonium carbonate was next added to the solution and dissolved by further addition of ammonia. To the solution thus obtained 129.5 grams (1.01 moles) of cadmium oxide was added over a period of 15 minutes. With the temperature controlled at 30–40° C., additional ammonia gas was charged to the mixture until a faintly turbid solution was obtained. This was filtered through a pad of filter-aid in order to obtain a clear water-white solution of ammine cadmium selenite.

This latter solution was slowly added to a mixture of 530 ml. of 85% hydrazine hydrate and 10 ml. of acetic acid which had been preheated to 85–90° C. After the mixing of the reactants was complete and the nitrogen evolution had stopped, the resulting slurry was cooled to room temperature and filtered. The solid material was washed with 500 ml. of water and then slurried with two 150 ml. portions of 50% acetic acid. It was isolated by filtration and washed with 3.5 liters of deionized water in order to remove all water soluble material. The solid cadmium selenide thus obtained was dried in vacuo and weighed 184 grams.

Addition of 0.01 mole percent of copper acetate to an aqueous solution of ammine cadmium selenite, and reduction with hydrazine as described immediately above gives cadmium selenide activated with about 0.01 mole percent of copper.

EXAMPLE 5

*Copper selenide*

A mixture of 1.0 mole of copper (II) acetate and 0.5 mole of selenious acid in water was treated with ammonia gas until all of the solid dissolved, and the indigo colored tetrammine copper (II)) complex was formed. This solution was added dropwise to a preheated mixture or 230 ml. of 85% hydrazine hydrate, 200 ml. of water and 300 ml. of glacial acetic acid. The temperature was maintained at about 80–85° C. until addition of the copper complex and evolution of nitrogen was complete. At the end of this time, the reaction mixture had become black. The solid copper (I) selenide was isolated by filtration and dried. Calculated for $Cu_2Se$: Cu, 61.3%; Se, 38.7%. Found: Cu, 60.7%; Se, 39.3%.

When the above experiment is repeated with 0.5 moles of copper (II) acetate and 0.5 moles of selenious acid, copper (II) selenide is obtained as the product of the hydrazine reduction.

EXAMPLE 6

*Cadmium selenide*

A 500 ml. Morton flask was fitted wtih a condenser thermometer and two calibrated charging funnels, and adjusted for product over-flow from the flask at the 250–300 ml. level. The over-flow discharge pipe was fitted to an agitated cooled vessel from which product could be continuously withdrawn.

100 ml. of 85% hydrazine hydrate containing acetic acid at a concentration of 10 ml. per liter was charged to the reactor. The system was purged with nitrogen to provide an inert atmosphere in the reaction zone. 85% hydrazine hydrate containing 10 ml. of acetic acid per liter was added to one of the charging funnels. An aqueous solution of ammine cadmium selenite containing 0.00114 mole of selenium per milliliter was charged to the second addition funnel. The hydrazine solution in the reaction flask was heated to 80° C., and hydrazine hydrate addition to the reactor started at a rate of about 6 ml. per minute. The addition of ammine cadmium selenite to the reactor was then begun at a rate of about 5.6 ml. per minute. The reaction mixture immediately became orange-red in color. This signified the formation of cadmium selenide hydrazinate. This product was not isolated. The color of the reaction mixture gradually deepened to brown-black when the volume of the reaction mixture reached the level of the over-flow tube, the slurry of finely divided solids over-flowed to the agitated surge vessel. The temperature in the surge vessel was maintained at about 30–35° C. The addition of hydrazine hydrate and ammine cadmium selenite to the reactor was continued for three hours with continuous withdrawal of reaction mixture via the over-flow tube. The average rate of addition of the hydrazine hydrate solution was 4.8 ml. per minute and of ammine cadmium selenite solution 5.2 ml. per minute. The retention time in the reactor was calculated to be 25 minutes.

The slurry over-flow to the surge vessel was collected in two fractions: the collected over-flow during the first hour of operation identified as sample I, and the over-flow during the final two hours of operation as sample II. Each sample was then separately filtered, washed with deionized water, slurried with two portions of 50° acetic acid, rewashed with deionized water and finally dried in vacuo. The product obtained was cadmium selenide.

Any departure from the above description which conforms to the present invention is intended to be included within the scope of the claims.

What is claimed is:

1. In the manufacture of a metal selenide, the step which comprises reacting an ammine metal selenite, wherein the metal is selected from the group consisting of copper, zinc and cadmium, with hydrazine hydrate in an aqueous solution at a temperature of at least about 80° C., wherein at least 4 moles of hydrazine hydrate are employed per mole of ammine metal selenite, and recovering said metal selenide.

2. In the manufacture of zinc selenide, the step which comprises reacting ammine zinc selenite with hydrazine hydrate in an aqueous solution at a temperature of at least about 80° C., wherein at least 4 moles of hydrazine hydrate are employed per mole of ammine zinc selenite, to form zinc selenide hydrazinate and recovering zinc selenide therefrom.

3. In the manufacture of cadmium selenide, the step which comprises reacting ammine cadmium selenite with hydrazine hydrate in an aqueous solution at a temperature of at least about 80° C., wherein at least 4 moles of hydrazine hydrate are employed per mole of ammine cadmium selenite, to form cadmium selenide hydrazinate and recovering cadmium selenide therefrom.

4. In the manufacture of copper selenide, the step which comprises reacting ammine copper selenite with hydrazine hydrate in an aqueous solution at a temperature of at least about 80° C., wherein at least 4 moles of hydrazine hydrate are employed per mole of ammine copper selenite and recovering copper selenide.

References Cited in the file of this patent

UNITED STATES PATENTS

| | | |
|---|---|---|
| 2,176,495 | Gordon et al. | Oct. 17, 1939 |
| 2,402,759 | Severenz | June 25, 1946 |
| 2,698,915 | Piper | Jan. 4, 1953 |
| 2,767,049 | Nitsche | Oct. 16, 1956 |

OTHER REFERENCES

Hovorka in "Chemical Abstracts," vol. 27, col. 5020(2), 1933.

Mellor: "Comprehensive Treatise on Inorganic and Theoretical Chemistry," Longmans, Green and Co., N.Y., 1923, vol. 10, pp. 776–8.